United States Patent [19]

Hughes

[11] Patent Number: 5,544,558

[45] Date of Patent: Aug. 13, 1996

[54] APPARATUS FOR DETECTING THE POSITION OF AN OBJECT ALONG A SECONDARY AXIS AND SCANNING A PROFILE OF THE OBJECT IN A PRIMARY AXIS

[75] Inventor: Michael Hughes, Beaver Meadow, Vt.

[73] Assignee: Silvatech Corporation, Bethel, Vt.

[21] Appl. No.: 183,434

[22] Filed: Jan. 19, 1994

[51] Int. Cl.[6] .............................. B26D 5/00; B27B 29/10; G01N 21/84

[52] U.S. Cl. .............................. 83/75.5; 83/76.8; 83/364; 83/365; 83/367; 144/357; 250/206.2; 250/208.1; 250/454.11

[58] Field of Search .................................... 83/75.5, 76.8, 83/364, 365, 367; 144/357; 250/206.1, 206.2, 208.1, 208.3, 454.11

[56] References Cited

U.S. PATENT DOCUMENTS 4,926,917  5/1990  Kirbach ................. 83/76.8 X
4,941,100  7/1990  McFarlane et al. ................. 144/357 X

*Primary Examiner*—Rinaldi I. Rada
*Assistant Examiner*—Raymond D. Woods
*Attorney, Agent, or Firm*—Sughrue, Mion, Zinn, Macpeak & Seas

[57] ABSTRACT

A positioning device having a transmitter mounted on a carriage which is movable along a secondary axis. A linear detection array is provided to scan a profile of an object mounted on the carriage. The detection array has a plurality of sensors which are arrayed in a direction which is parallel to the secondary axis. A directing device serves to direct a signal emitted from the transmitter to a corresponding one of the sensors which is in opposition to the transmitter. Position of the carriage, along the secondary axis, can be determined based on the on/off status of the sensors.

16 Claims, 2 Drawing Sheets

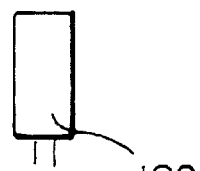
FIG.2
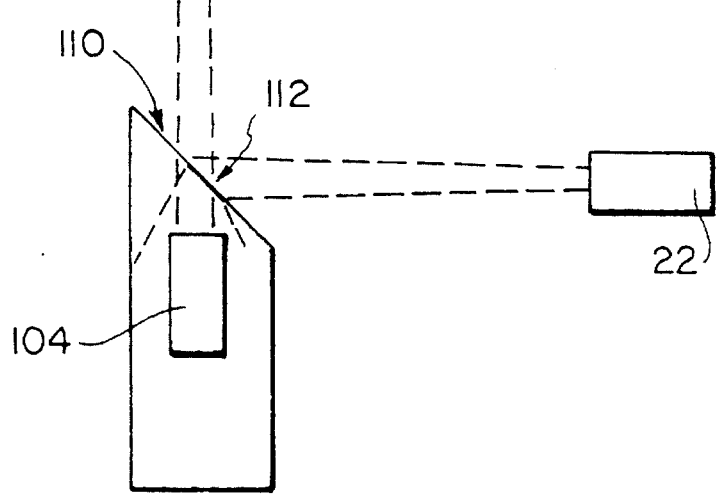
FIG.3
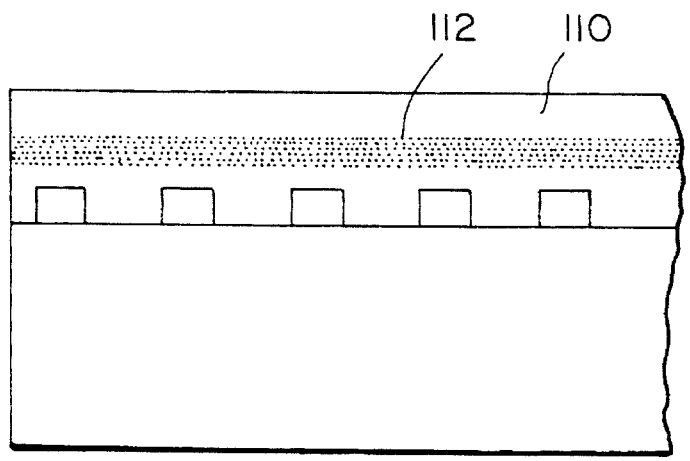

APPARATUS FOR DETECTING THE POSITION OF AN OBJECT ALONG A SECONDARY AXIS AND SCANNING A PROFILE OF THE OBJECT IN A PRIMARY AXIS

BACKGROUND OF THE INVENTION

1. Field of the Invention

The present invention relates to a position indicating device which allows the position of an object, along a secondary axis, to be detected while the object is being scanned in a primary axis. In particular, the invention relates to an apparatus wherein a scanning array which is used to detect the profile of an object in a primary axis is also used to detect position of the object in a secondary axis.

2. Description of the Related Art

There are many applications for which it is desirable to scan an object in order to obtain a positional profile of the object. For example, conventional sawmill devices utilize a photocell array to determine the profile of a log to cut the log in a manner that maximizes yield. In particular, an array of transmitters, such as photo-emitter devices is aligned in parallel with a transverse axis of a rotary saw blade and an array of receivers, such as photo-detectors, are aligned in opposition to the transmitter array. In this manner, the two arrays define a plurality of transmitter/receiver pairs that can each detect the presence/absence of a portion of the log therebetween. Therefore, the status of the receivers taken in combination is indicative of the profile of the log.

In such a conventional device, the log is supported on a moveable carriage in order to allow the log to be fed along the primary axis to a position in front of the blade. The carriage is also moveable along a secondary axis toward the blade to accomplish a cutting operation. Of course in order to obtain meaningful profile data, the position of the log along the secondary axis must be determined in a precise manner. Known systems accomplish this by detecting the position of the carriage, upon which the log is supported, through the use of an encoder device coupled the carriage or the drive mechanism associated with the carriage.

Encoders, such as an optical encoder using and encoded wheel must be precisely calibrated. Also, known encoders are fragile and expensive. Further, since an encoder must be mechanically coupled to the carriage or drive device, mechanical tolerance must be very precise in order to obtain a reliable portion signal. This further complicates the structure and raises the cost of conventional positioning devices.

SUMMARY OF THE INVENTION

In view of the above, it is an object of the present invention to provide a device for positioning an object along a secondary axis which is inexpensive and reliable. To achieve this object, the invention has a transmitter on the device to be positioned which is directed along the primary axis and a scanning array extending along the secondary axis for determining a profile of the object. A device deflects the signal transmitted by the transmitter to be received by an appropriate portion of the scanning array. The portion of the scanning array that receives the signal indicates the position of the object.

BRIEF DESCRIPTION OF THE DRAWINGS

FIG. 2 is a side view of the sensor arrangement of the preferred embodiment; and FIG. 3 is a partial front view of the receiver array of the preferred embodiment of the invention.

DETAILED DESCRIPTION OF THE PREFERRED EMBODIMENT

Figure 1:
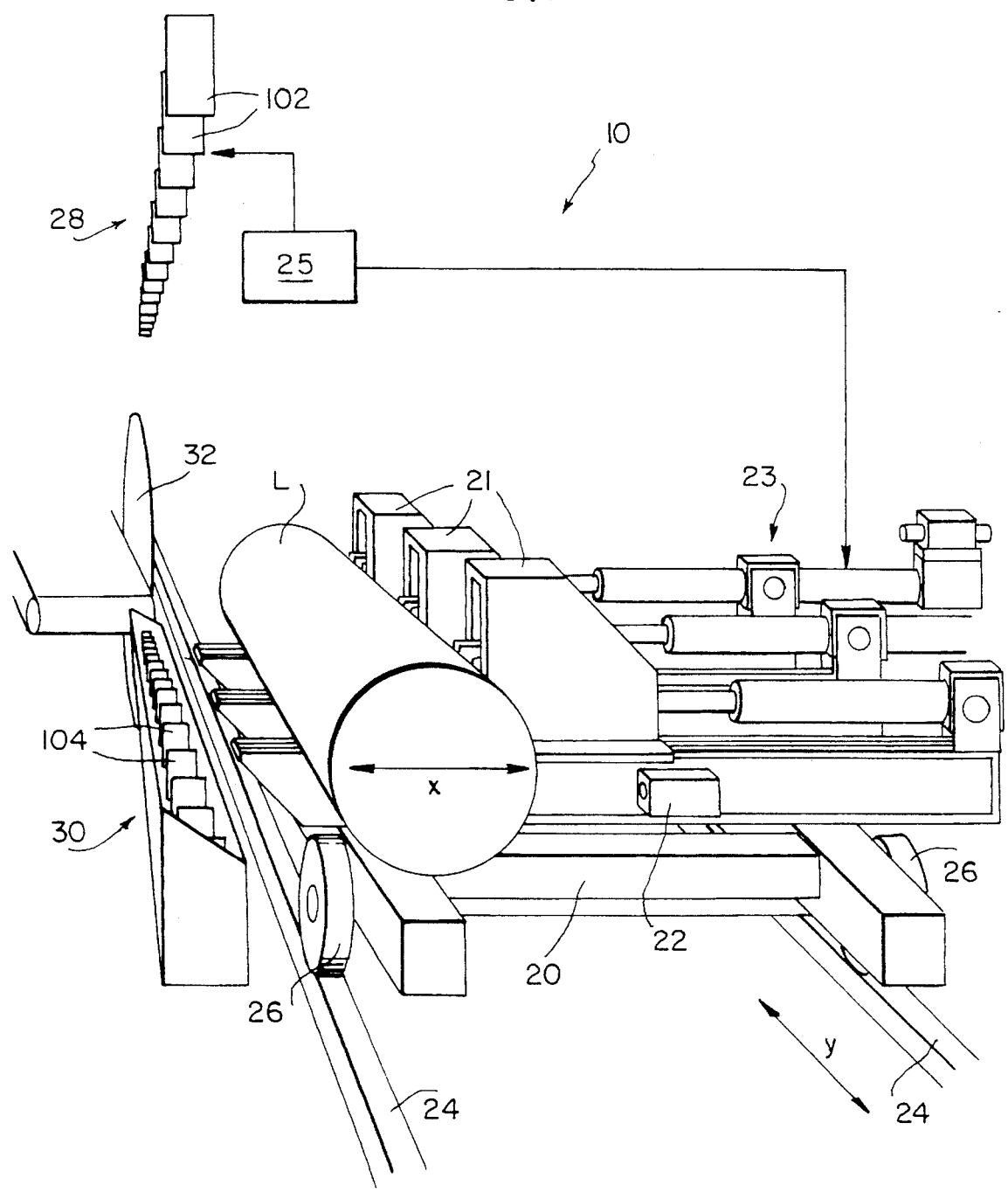
FIG. 1 is a perspective view of the preferred embodiment of the invention.

The preferred embodiment of the invention is applied to detecting the position of a carriage which supports a log in a sawmill device and is illustrated in FIGS. 1–3.

FIG. 1 is a perspective view of the preferred embodiment of the invention. Sawmill 10 has carriage 20 on which log L is supported. Uprights 21 of carriage 20 are moveable in the primary axis direction indicated by arrow x. Uprights 21 are moved by piston cylinder arrangement 23 which is controlled in a known manner by a microprocessor based controller 25, or the like. Movement of uprights 21 to the left in FIG. 1 places a portion of log L in the cutting position opposite rotary blade 32. Also, carriage 20 can be moved along a secondary axis, indicated by arrow y, to accomplish a cutting operation. In particular, carriage 20 has wheels 26 which ride on rails 24. Motion of carriage 20 is accomplished by known servo devices in response to a signal generated by the controller.

The precise portion of log L which is placed in the cutting position is determined by the controller 25 based on a profile signal provided by scanner transmitter receiver array 28 and receiver array 30, together which constitute a detection array. Particularly, uprights 21 are moved to the left in FIG. 1 to position the leading edge of the log in an area between transmitter array 28 and receiver array 30. Transmitter array 28 has a plurality phototransmitters, two of which are indicated in FIG. 1, arrayed along a direction which is parallel to the secondary axis. Similarly, receiver array 30 has a plurality of photoreceivers 104, two of which are indicated in FIG. 1, arrayed in opposition to respective ones of phototransmitters 102. Accordingly, the leading edge of log L can be detected by the respective on/off states of the photoreceivers 104 and a profile of the log can be determined by the controller based on the on/off states and the position of uprights 21, which can be determined in a known manner.

To maximize efficiency of a sawing operation, scanning is accomplished while carriage 20, and thus log L, is moved along rails 24 in the secondary axis direction. In this manner, a log profile can be determined while log L is being carried toward rotary sawblade 32. However, in order to simultaneously determine a profile and move log L toward sawblade 32, the controller must accurately monitor the position of carriage 20 along the secondary axis. In order to monitor this position, the preferred embodiment has phototransmitter 22 mounted directly on carriage 20. Phototransmitter 22 emits light in the primary axis direction towards photoreceiver array 30.

As illustrated in FIGS. 2 and 3, photoreceiver array 30 has transparent plate 110 disposed above photoreceivers 104 and in a plane which is slanted with respect to the primary axis. A central portion of transparent plate 110 has diffuse reflector 112 formed thereon. Diffuse reflector 112 serves to diffract light emitted by phototransmitter 22 towards a respective one of photoreceivers 104. Accordingly, when phototransmitter 22 is emitting light, a particular one of photoreceivers 104, i.e. the one of photoreceivers 104 which is aligned with phototransmitter 22 along the secondary axis, will be placed in the on state due to light emitted from phototransmitter 22.

Therefore, the controller 25 can determine the position of phototransmitter 22, and thus carriage 20, by monitoring the on/off status of photoreceivers 104. Phototransmitter 22 is intermittently turned on in an alternating manner with respect to phototransmitters 102, which are used for a profile scan. Timing of the profile scan and carriage position detection are accomplished by the controller 25 in a predetermined manner. In this manner, the same photoreceivers which are used for a profile scan can be used for carriage positioning detection. Accordingly, the carriage position, along the secondary axis, can be accurately and quickly detected by an inexpensive apparatus.

The invention has been described through a preferred embodiment. However, it will be apparent to one skilled in the art that various modifications can be made without departing from the scope of the invention as defined by the appended claims. For example, radio frequency transmitters and receivers, or the like can be utilized in place of the phototransmitters and photoreceivers of the preferred embodiment. Also, the phototransmitters of the invention may be frequency or wavelength multiplexed instead of the time based multiplexing of the preferred embodiment. In addition, any device for directing the signal from the transmitter mounted on the carriage, such as a half mirror, or the like, can be utilized in place of the diffuse reflector. Finally, a receiver can be mounted on the carriage and transmitter signals from the transmitter array can be directed to that receiver. In such a case, the transmitters can be multiplied in a time based or frequency based manner to distinguish between the transmitters.

What is claimed:

1. An apparatus for determining a position of an object along a secondary axis while a profile of the object in a primary axis, which is perpendicular to the secondary axis, is determined, said apparatus comprising:

a carriage which supports the object;

means for moving the object on said carriage along the primary axis;

means for moving said carriage along the secondary axis;

a transmitter mounted on said carriage, said transmitter emitting a first signal;

a detection array comprising a plurality of detectors disposed along a line which is parallel to said second secondary axis;

means for determining the profile of said object based on respective detection status of said detectors;

means for directing the first signal towards said detection array; and means for determining a position of the object based on which of said detectors receives said first signal.

2. An apparatus as claimed in claim 1, wherein said transmitter emits said first signal in a direction which is parallel with the primary axis and said detectors are directed in a direction which is perpendicular to said primary axis and said secondary axis.

3. An apparatus as claimed in claim 2, wherein said detectors are photoreceivers and said transmitter is a phototransmitter.

4. An apparatus as claimed in claim 3, wherein said directing means is a diffuse reflector.

5. An apparatus as claimed in claim 4, wherein said detection array further comprises a plurality of profile transmitters transmitting a second signal and being arrayed in opposition to respective ones of said photoreceivers, said profile determining means determining the profile of the object based on an on/off status of said photoreceivers in response to said second signal.

6. An apparatus as claimed in claim 3, wherein said directing means is a half mirror.

7. An apparatus as claimed in claim 6, wherein said detection array further comprises a plurality of profile transmitters transmitting a second signal and being arrayed in opposition to respective ones of said photoreceivers, said profile determining means determining the profile of the object based on an on/off status of said photoreceivers in response to said second signal.

8. An apparatus as claimed in claim 3, wherein said detection array further comprises a plurality of profile transmitters transmitting a second signal and being arrayed in opposition to respective ones of said photoreceivers, said profile determining means determining the profile of the object based on an on/off status of said photoreceivers in response to said second signal.

9. An sawmill apparatus for determining a position of a carriage carrying a log along a secondary axis while a profile of the log in a primary axis, which is perpendicular to the secondary axis, is determined, said apparatus comprising:

a saw blade for carrying out a sawing operation on the log;

a carriage which supports the log;

means for moving the log on said carriage along the primary axis;

means for moving said carriage along the secondary axis;

a transmitter mounted on said carriage, said transmitter emitting a first signal;

a detection array comprising a plurality of detectors disposed along a line which is parallel to said second secondary axis;

means for determining the profile of the log based on respective detection status of said detectors;

means for directing the first signal towards said detection array; and means for determining a position of the log based on which of said detectors receives said first signal.

10. A sawmill apparatus as claimed in claim 9, wherein said transmitter emits said first signal in a direction which is parallel with the primary axis and said detectors are directed in a direction which is perpendicular to said primary axis and said secondary axis.

11. A sawmill apparatus as claimed in claim 10, wherein said detectors are photodetectors and said transmitter is a phototransmitter.

12. A sawmill apparatus as claimed in claim 11, wherein said directing means is a diffuse reflector.

13. A sawmill apparatus as claimed in claim 12, wherein said detection array further comprises a plurality of profile transmitters transmitting a second signal and being arrayed in opposition to respective ones of said photoreceivers, said profile determining means determining the profile of the log based on an on/off status of said photoreceivers in response to said second signal.

14. A sawmill apparatus as claimed in claim 11, wherein said directing means is a half mirror.

15. A sawmill apparatus as claimed in claim 14, wherein said detection array further comprises a plurality of profile transmitters transmitting a second signal and being arrayed in opposition to respective ones of said photoreceivers, said profile determining means determining the profile of the log based on an on/off status of said photoreceivers in response to said second signal.

16. A sawmill apparatus as claimed in claim 11, wherein said detection array further comprises a plurality of profile transmitters transmitting a second signal and being arrayed in opposition to respective ones of said photoreceivers, said profile determining means determining the profile of the log based on an on/off status of said photoreceivers in response to said second signal.

* * * * *